United States Patent Office 3,551,778
Patented Dec. 29, 1970

3,551,778
CONTROL SYSTEM FOR A STATIC CONVERTER CONNECTING A DC NETWORK TO AN AC NETWORK
Åke Ekström, Ludvika, Sweden, assignor to Allmanna Svenska Elektriska Aktiebolaget, Vasteras, Sweden, a corporation of Sweden
Filed Nov. 27, 1968, Ser. No. 779,368
Claims priority, application Sweden, Dec. 1, 1967, 16,515/67
Int. Cl. H02m *1/08, 1/18, 7/72*
U.S. Cl. 321—5        6 Claims

ABSTRACT OF THE DISCLOSURE

A static converter connecting a D.C. network and an A.C. network has a control system for controlling a control pulse generator for the rectifiers of the converter. Said control system comprises two time measuring means one of which measures the time $T/n$ where T is the period time of said A.C. network while $n$ is the pulse number of the converter. The other time measuring means measures the time $t$ from the last control pulse from the control pulse generator. Said two time measuring means are connected to the input of a comparator which gives an output signal to the control pulse generator each time $t$ passes $T/n$.

BACKGROUND OF THE INVENTION

(1) Field of the invention

The present invention relates to a system for controlling the rectifiers in a static converter by means of control pulses to the control electrodes of the rectifiers, the static converter being one which connects a direct current network to an alternating current network, said system comprising a control pulse generator which emits control pulses to the rectifiers of the static converter.

(2) The prior art

For controlling a static converter connecting a direct current network to an alternating current network the control pulses for the rectifiers of the static converter have peviously been derived by comparing a control voltage in the form of a direct voltage which is common for all the rectifiers of the static converter with a control function voltage for each of the rectifiers of the static converter in the form of an alternating voltage derived from the commutation voltages of the various rectifiers, which commutation voltages in turn are derived from the line voltages of the alternating current network. Such a control principle operates well as long as the short circuit power of the alternating current network is large in relation to the transmitted power of the static converter so that no, or only small, disturbances arise in the curve shape of the network voltages, but, with increased power in the static converters in relation to the network, the control function voltage becomes very sensitive to disturbances in the commutation voltages which, through the control function voltages, influence the control of the rectifiers of the static converter and this may give rise to further disturbances in the alternating current network so that serious oscillations may occur.

In order to avoid said control function voltage it has been proposed to use an oscillator to control the rectifiers, the frequency of the oscillator being corrected in one way or another by means of a regulator which endeavours to set the oscillator frequency and phase position in relation to the alternating current network so that a given operating magnitude of the static converter assumes a desired magnitude. This means that all corrections due to disturbances or alterations of the setting must take place by way of said regulator and said oscillator, which causes a delay in the control.

SUMMARY OF THE INVENTION

According to the present invention it is now proposed to control the static converter in such a way that each rectifier in the static converter is supplied with a control pulse in that moment when the period after the control pulse for the previous rectifier in the commutation sequence is equal to the period for an alternating current network connected to the current converter divided by the pulse number of the current converter. A control system according to this principle will thus comprise a summation member to the input side of which is connected two members, the first of which is connected to the control pulse generator to derive a magnitude as a function of the time since the last control pulse from the control pulse generator, while the other member is connected to the alternating current network to derive a magnitude proportional to the network period divided by the pulse number of the static converter. This summation member is connected over a comparator to the input side of the control pulse generator so that when the magnitudes from said two members are equal a signal is emitted to the control pulse generator which then emits the next control pulse.

When such a control system has once been started the control pulse generator will continue to deliver control pulses having frequencies in agreement with the alternating current network connected to the static converter and their phase position will remain constant in relation to the alternating voltages of the network. This is because all frequency alterations or disturbances in the alternating current network are reflected in the time-measuring member. Said alterations or disturbances will therefore not pass the control circuit system and therefore a considerably quicker and more stable control is obtained in comparison with previously known principles.

As in previously known control principles the system is provided with a regulator, the output signal of which is dependent on the magnitude of a certain operating magnitude of the static converter in relation to a certain desired value of said operating magnitude.

According to the invention the output signal from said regulator is connected to the input side of said summation member and if a deviation occurs between said operating magnitude and its desired value the signal from the regulator will correct the time between subsequent commutations so that an alteration is obtained in their phase positions so that said operating magnitude returns to its desired value or adopts a new desired value. When this has occurred the output signal from the regulator becomes zero and the control system continues to control the control pulse generator of the static converter so that this now emits its control pulses with a new phase position in relation to the alternating voltage of the static converter as long as no further alterations occur in said operating magnitude or its desired value. Since the alteration in phase position at each ignition is directly proportional to the regulator voltage, the external control can be linearised by dividing the regulator voltage by the real commutation voltage.

As with the known principle with oscillator control, according to the system of the present invention the upper and lower limits of the delay angles of the rectifiers of the static converter must be determined, and these limits can be determined as permanent limits or, in a manner known per se, by taking into consideration the real commutation voltages and commutation currents.

BRIEF DESCRIPTION OF THE DRAWINGS

The invention will be further described with reference to the accompanying drawings where FIG. 1 shows a static converter having a control system according to the invention while

DESCRIPTION OF THE PREFERRED EMBODIMENTS

Figure 1:
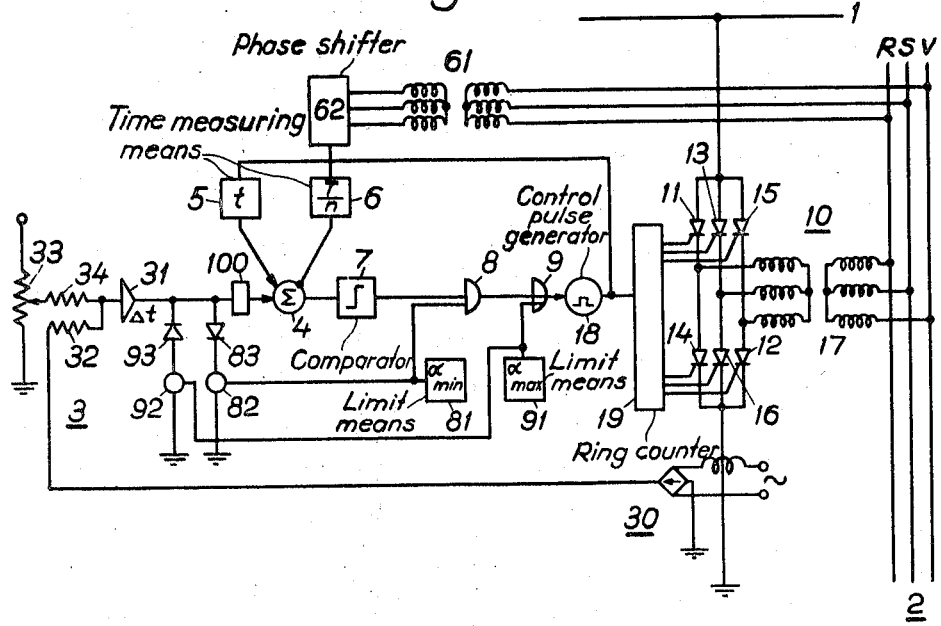

FIG. 1 shows a static converter 10 which connects a direct current network 1 to an alternating current network 2. The static converter comprises a rectifier bridge with six rectifiers 11–16 and a converter-transformer 17. The converter is provided with a control system in which the components 4–7 and 18 and 19 will be considered first.

The member 4 is a summation member to the input side of which are connected two members 5 and 6. The member 6 is designed to derive the period T in the alternating current network 2, which is suitably done by measuring the half period $T/2$ which is obtained by measuring the time between two subsequent passages through zero of a phase voltage in the network 2. The line voltages from the network 2 are taken out through a voltage transformer 61. As especially with inverter operation it is important that the value of the period T is always up to date, the voltage from the voltage transformer 61 is suitably passed through a phase shifting device 62 so that the output voltages from this phase shifting device passes zero a certain time before the respective line voltages of the alternating current network 2 itself. The exact value of this phase-shifting is unimportant and a slight variation may be permitted as long as the latest passage through zero of the output voltage from the phase-shifting device 62 is obtained a suitable time before the next commutation. In the device 6 the half period $T/2$ is converted to $T/n$, that is, the period divided by the pulse number $n$ of the converter. The output signal from the member 6 is suitably connected to the member 4 with negative sign. The member 5 is simply a time-measuring member, for instance consisting of a capacitor and a constant charging voltage for this, together with a cancelling circuit. In other words, the member 5 may be in the form of an integrator-amplifier which is forced to zero output voltage for a short moment at each ignition of a rectifier. The output signal from the member 5 will thus also correspond to the time $t$ since the latest control pulse from the pulse generator 18. At a certain moment, therefore, the signal from the member 5 will equal the signal from the member 6 and the output signal from the summation member 4 to the comparator 7 will therefore be zero. The comparator 7 will then emit a signal which through the And-gate 8 and the Or-gate 9 goes to the control pulse generator 18.

Figure 1A:
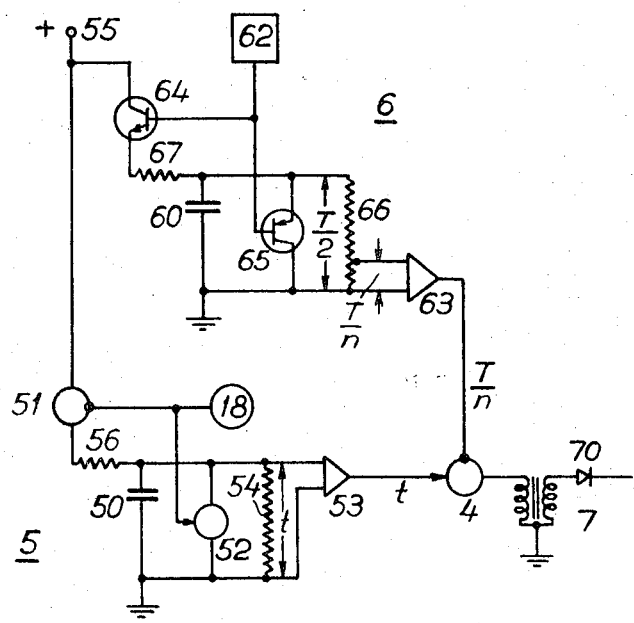
FIGS. 1a, 4 and 5 show details of FIG. 1.

The components 4–7 are shown more in detail in FIG. 1a. The components 5 and 6 are time measuring means for instance comprising a capacitor 50 resp. 60 charged from a common voltage source connected to the terminal 55.

The capacitor 50 is charged through an electronic switch 51 having the same character as a relay with a break contact and the capacitor is discharged over another electronic switch 52 having the character of a relay with a make contact. Both said switches are controlled from the control pulse generator 18 in FIG. 1. When the pulse generator 18 gives a pulse—suitably a peak pulse— the switch 51 is interrupted while switch 52 is closed so that the capacitor 50 is discharged. After said peak pulse the switch 52 is interrupted and switch 51 is closed so that the capacitor 50 is charged from the voltage on 55 through the resistor 56. Thus the voltage over capacitor 50 and resistor 54 is proportional to the time since the last pulse from the generator 18. The capacitor voltage is fed to the summaring member 4 over an amplifier 53.

The capacitor 60 is charged over a transistor 64 and discharged over another transistor 65. These two transistors are controlled from a phase voltage from the phase shifter 62 so that if said phase voltage is positive the transistor 64 is conducting and capacitor 60 is charged through resistor 67 and if said phase voltage is negative the transistor 65 is conducting and the capacitor 60 is discharged. Thus at the end of a positive half period of said phase voltage the voltage over the capacitor 60 and resistor 66 is proportional to the length of said half period, ie., $T/2$. A part of this voltage corresponding to $T/n$ is taken out from a tapping on resistor 66 and fed to the amplifier 63 the output of which is connected to the member 4. The amplifier 63 should be of a storing type controlled from the phase-shifter 62 so that a new input value is entered at the end of each half period of said phase voltage. For the same reason a number of capacitors 60 with charging and discharging switches 64 resp. 65 could be arranged for measuring and storing the value $T/n$ for each half period of the phase voltages from 62.

The summaring member 4 is made with respect to the output signals from the amplifiers 63 and 53 so that if said signals are voltages they are series connected and if they are currents they are parallel connected.

The output from 4 is connected to the comparator 7 which could be an impulse transformer. Thus at a zero passage of the signal from 4, which means that $t=T/n$, an output signal is given from the secondary winding of the impulse transformer 7. As it is only the zero passages in one direction, namely when $t$ exceeds $T/n$, which are of interest the diode 70 is inserted. The signals passing the diode 70 are then fed to the control pulse generator 18.

The control pulses from the control pulse generator 18 are fed successively through a ring counter 19 to the control electrodes of the various rectifiers 11–16. A ring counter is, for instance, described in the SCR Manual, 4th edition, 1967, of General Electric, page 161, and considered as a circuit that sequentially transfers voltage from one load to the next, when a number of loads are connected in parallel from a common supply.

Figure 2:
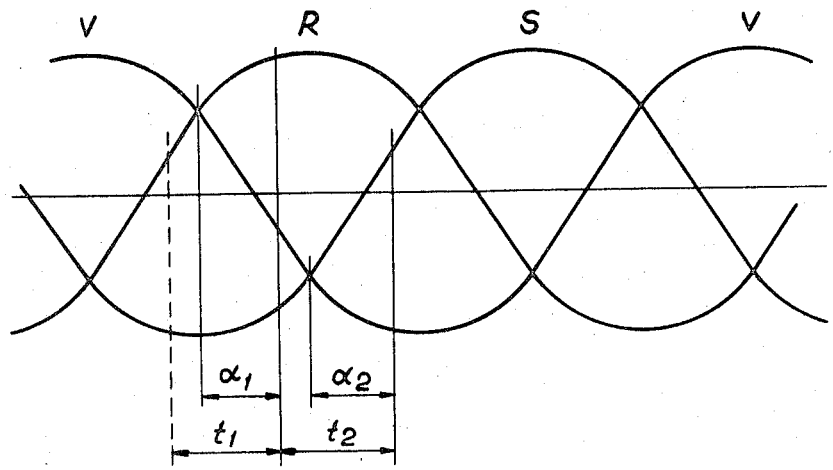
FIGS. 2 and 3 show voltage curves for the system.

The control pulse generator will thus emit pulses at regular intervals which are equal to $T/n$ and in this case with the pulse number six a control pulse will be emitted each 60° of the period of the alternating current network 2. The situation is clear from FIG. 2 which shows the phase voltages, R, S and V. The rectifier 11 will, for example, ignite with a delay angle $\alpha_1$ in relation to the zero passage of its commutation voltage R-V. This ignition moment will be the time $t1$ after the previous ignition pulse for the rectifier 16. In the same way the rectifier 12 will ignite after a time $t2$ after the ignition of the rectifier 11 and thus has a delay angle $\alpha_2$ in relation to the zero passage of its control voltage V-S. The times $t1$, $t2$, etc. are always equal to the period T of the network 2 divided by the pulse number of the converter and if the alternating voltage RSV is symmetrical the delay angles $\alpha_1$, $\alpha_2$, etc. will be independent of alterations in the frequency and thus the time T of the network 2.

In order to control the static converter with respect to a certain desired magnitude of a certain operating magnitude in the converter, for example its direct current, the control system must be supplied with a regulator 3, which in this case is shown as a current regulator comprising a desired value emitter in the form of a potentiometer 33 and a real value emitter in the form of a measuring transducer 30, which is connected in the direct current conductor of the converter and fed from an alternating current source and also connected to the current regulator 3 by means of a rectifier bridge. The output voltage from this rectifier bridge is fed through a resistor 32 to the input side of a control amplifier 31, to the input side of which is also connected the desired value emitter 33 over another resistor 34. The difference between the two input signals is fed through the control amplifier 31 into the summation number 4. As long as the measured direct current is equal to the current value set on the desired value emitter, the input, and thus the output signal for the amplifier 31 will be equal to zero, and the converter will operate with constant, unaltered delay angle. If, on the other hand, the direct current deviates from the desired value set, the regulator will emit a signal $\Delta t$, which is added in the summation member 4 to the signals from the members 5 and 6. The moments of zero passage of the output voltage from the member 4 are thus altered, and consequently the times $t1$, $t2$, etc. between the control pulses from the control pulse generator 18 and also the delay angles $\alpha_1$, $\alpha_2$ of the rectifiers. As is usually the case the output signal $\Delta t$ from the amplifier 31 is negative in relation to the difference between the two input signals over the resistors 32 and 34. This means, therefore, that if the real current is greater than the current set, the delay angle $\alpha$ must be increased. The addition $\Delta t$ will be negative and the time $t$ until the output signal from the member 4 becomes zero will be longer. If, however, the direct current of the converter is too low the difference signal to the input side of the regulator 31 will be negative and $\Delta t$ will therefore be positive, which decreases the time $t$ between subsequent commutations, and thus the delay angle $\alpha$. It is quite clear from the basic rules of converter technique that this course is independent of whether the converter operates as a rectifier or as an inverter.

By an alteration in the delay angle $\alpha$ the internal voltage $Dio \cos \alpha$ of the converter is also altered, where $Dio$ is proportional to the amplitude value of the alternating voltage in the network 2, and if this direct voltage reaches such a value in relation to the direct voltage in the direct current network 1 that the desired current value is obtained, the signal disappears from the regulator 31 and the converter continues to operate with a new constant delay angle $\alpha$. If, however, such balance cannot be achieved, the output signal from the regulator amplifier 31 persists and the delay angle $\alpha$ is constantly decreased or increased. If no special steps were taken $\alpha$ would sooner or later become negative or exceed 180°, respectively, which in both cases would mean that the synchronism between the control system and the alternating network 2 would be lost and the converter operation would break down. In order to avoid this, therefore, there must be an arrangement to limit the delay angle $\alpha$. Such an arrangement is shown in FIG. 1 as the components 81 and 91 for minimum and maximum limitation of $\alpha$, respectively. The minimum limitation of $\alpha$ is thus connected to the system over an And-gate 8 which means that the signal from the computer 7 cannot be passed on to the control pulse generator 18 until a certain minimum delay angle $\alpha$ has been passed, i.e., before a signal from 81 is obtained. The member 91 is connected to the system over an Or-gate 9 which means that at too large a delay angle from the comparator 7 the member 91 will deliver a signal to the control pulse generator 18 when the maximum limit for the delay angle $\alpha$ has been reached.

Figure 3:
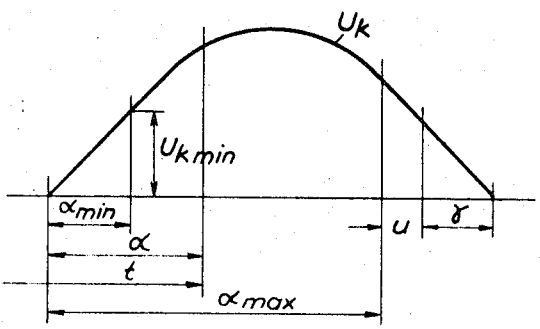

The situation is more clearly illustrated in FIG. 3 where a half period of the commutation voltage $U_k$ for a rectifier is indicated together with the delay angle $\alpha$, time $t$ and limits $\alpha_{min}$ and $\alpha_{max}$ of the delay angle.

The limit angle devices 81 and 91 can quite simply operate with permanent limits for the delay angles and each of these devices can be constructed more or less as a combination of members similar to the members 4, 5 and 6. The members corresponding to the member 6 will thus derive magnitudes=period T times desired limit angle $\alpha_{min}$ or $\alpha_{max}$ respectively through 360°, whereas a member corresponding to the member 5 which may be common for the members 81 and 91 simply measures the angle from the zero passage of the commutation voltage in question. The members 81 and 91, respectively, will therefore emit signals when this angle is equal to the preset angles $\alpha_{min}$ and $\alpha_{max}$.

However, the use of such permanent limit angles does not usually provide sufficiently good control of the converter. FIG. 3 shows that the lower limit angle $\alpha_{min}$ corresponds to a certain value $U_{K\,min}$ of the commutation voltage $U_K$ and the determination of a lower limit angle for the control is based on the desire for a certain minimum commutation voltage at the start of the commutation so that a distinct and certain ignition of the rectifiers of the converter is obtained. The member 81 can therefore suitable be designed in accordance with the principle indicated in FIG. 4. The desired minimum commutation voltage $U_{K\,min}$ is set with the help of a potentiometer 85 and the real commutation voltages are measured with the help of a voltage transformer 84 connected to the network 2. Since the primary side of the voltage transformer is D-connected, it is the commutation voltages which are connected to the primary side of this voltage transformer so that the six phase-voltages on the star-connected secondary side of the voltage transformer correspond to the commutation voltages for the various rectifiers. The input of the member 81 must then contain some form of ring counter 86, such as the member 19, in order at each commutation to select the correct phase voltage from the voltage transformer 84 for comparison with the voltage from the potentiometer 85. Possibly the selection of the correct commutation voltage may be controlled by the pulses from the ring counter 19. The voltages from the potentiometer 85 and ring counter 86 are supplied to a summation member 87 and over the comparator 88 pulses are supplied to the And-gate 8 when the voltage 87 becomes zero. The comparator 88 may be of the same kind as the comparator 7 shown in FIG. 1$a$.

In FIG. 3 it is also indicated that after the upper limit angle $\alpha_{max}$ comes first the commutation angle $u$, that is the time during which the current commutates from one rectifier to the other while the angle from completion of the commutation to zero passage of the commutation voltage, the so-called commutation margin, is designated $\gamma$. As known, the desire for an upper limit angle is dictated by the desire for a certain minimum commutation margin, $\gamma$, regardless of the magnitude of the commutation voltage and the load current. The member 91 should thus suitably be designed as a member for controlling the commutation margin, for example according to either of the U.S. Pat. No. 2,774,012 or British Pat. No. 985,674.

It is seen that if the alternating voltage RSV in the network 2 is completely symmetrical, intervention from the regulator 3 will cause all the rectifiers to reach the upper or lower limit of the delay angle substantially simultaneously. If, on the other hand, the voltage in the alternating current network 2 is asymmetrical, the limits for the delay angles of the various rectifiers will also be asymmetrical, which causes asymmetrical control, that is different periods between the successive ignition pulses. This can be avoided if the limit value emitters 81 and 91 influence the blocking device 82–83 or 92–93, respectively, of the regulator 3, as indicated in FIG. 1. As mentioned previously, too low a current in the converter causes a positive regulator voltage $\Delta t$ which in turn causes a decrease in the delay angle $\alpha$ of the rectifiers of the converter. Thus, when the delay angle $\alpha$ has decreased so much that the limit value emitter 81 will influence an electronic switch 82 which, over a diode 83, discharges any positive regulator voltage $\Delta t$ for a certain time, suitably as long as half the period of the alternating current network 2. In this way the regulator 3 is prevented during said period from igniting the two subsequent rectifiers earlier than would occur with symmetrical ignition. The switch 82 has the character of a "Make contact relay."

Figure 4:
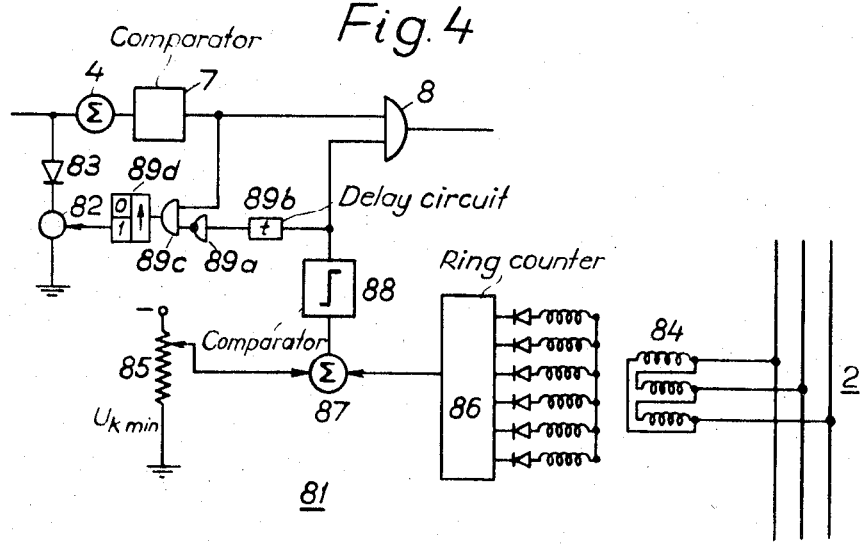

The control of the connection member 82 is shown in more detail in FIG. 4. It is seen that a positive regulator voltage should be discharged over 83 and 82 if the pulse from the comparator 7 arrives before the pulse from 81. If, however, the pulse from 81 arrives first, the regulator voltage must pass freely to the members 100 and 4. The member 82 must therefore be controlled from both the members 7 and 81, for example in accordance with FIG. 4. The output from the member 88 is supplied to the connection member 82 over a gate circuit 89 comprising the members 89a–d.

The switch 82 is controlled from a monostable multivibrator 89d which in turn is controlled from an And-gate 89c with two inputs connected to the comparators 7 and 88. The comparator 7 is connected directly to the gate 89c while the comparator 88 is connected to the gate 89c over a time delay member 89b giving a short delay of the signal of a reversing gate 89a.

This means that if the pulse from the comparator 7 arrives first, the gate 89a has no input signal and thus gives an output signal. The gate 89c thus has signals on both inputs and thus gives a signal to the monostable multivibrator 89d which during a certain time keeps the switch 82 conducting so that the positive regulator voltage is discharged over the diode 83. If, however, the pulse from the comparator 88 is first, the delay member 89b after a short time gives an input signal to the gate 89a so that the output signal of this gate is cancelled. Consequently the gate 89a cannot give any signal to the switch 82 which remains non-conducting.

The monostable multivibrator 89d may be of the kind as shown in General Electric's Transistor Manual, 1964, pages 200–201.

Similarly too high a direct current in the converter will cause a negative regulator voltage $\Delta t$ which causes an increase in the delay angle $\alpha$ and when this delay angle for the first rectifier reaches the upper limit angle set by the member 91, the member 91 will discharge any negative regulator voltage $\Delta t$ through the switch 92 and the diode 93 to earth during the following half period. This means that the two subsequent rectifiers cannot ignite later than what would correspond to equidistant ignition, that is, the ignition interval is exactly 60° el. Thus symmetrical control at the upper and lower limit angles is obtained even if the network voltage in the network 2 is assymetrical. It is clear that control of the switch 92 from 91 must take place depending on the time relationship between the output pulses from 7 and 91 in the same way as has been shown for the switch 82 in FIG. 4.

If the direct current of the converter deviates from the desired value the internal direct voltage of the converter must be altered by an amount proportional to the current deviation. In the control process described, the current deviation will cause a proportional negative alteration of the delay angle which, however, means that the voltage alteration will be proportional to the alteration in the cosine of the delay angle and thus not to the current deviation.

By dividing the output voltage $\Delta t$ from the control amplifier 31 by the real commutation voltage $U_K$, however, full proportionality is attained between the current deviation and the voltage alteration caused by this deviation, which can be shown by calculation of the control process.

Figure 5:
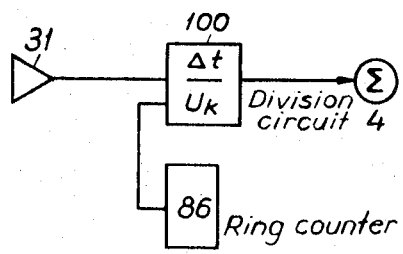

In FIG. 1 this has been shown by connecting the control amplifier 31 and the member 4 over the member 100. The connection of the member 100 is shown in more detail in FIG. 5 as comprising a division circuit to the input of which is connected the control amplifier 31 and also the commutation voltage, for example from the ring counter 86. Such a division circuit 100 may be of a kind as shown in Handbook of Analog Computation from Electronic Associates, Inc., Long Branch, N.J., 1964, page 45.

What is claimed is:

1. Control system for controlling a static converter comprising a plurality of rectifiers, said static converter connecting a direct current network to an alternating current network, said system comprising a control pulse generator which emits control pulses to the rectifiers of the static converter, in which the control system comprises a summation member to the input side of which are connected three members, the first of which is connected to the control pulse generator to derive a magnitude as a function of the time since the last control pulse from the control pulse generator, while the second member is connected to the alternating current network to derive a magnitude proportional to the network period divided by the pulse number of the current converter, the third member comprising a regulator the output signal of which is dependent on the difference between a certain operating magnitude of the current converter and a certain desired value for said operating magnitude, the summation member being connected over a comparator to the input side of the control pulse generator.

2. Control system according to claim 1, in which said comparator is connected to the control pulse generator over an And-gate to the input side of which is also connected a circuit to pre-set a certain minimum delay angle for the rectifiers of the current converter.

3. Control system according to claim 2, in which said regulator is provided on the output side with a blocking means controlled by said circuit.

4. Control system according to claim 1, in which said comparator is connected to the control pulse generator over an Or-gate to the input side of which is connected a circuit to pre-set a certain minimum commutation margin for the rectifiers of the current converter.

5. Control system according to claim 4, in which said regulator is provided on the output side with a blocking means controlled by said circuit.

6. Control system according to claim 1, in which the output side of said regulator comprises a division circuit to divide the output signal of the regulator by the acual value of the commutation voltage.

References Cited

UNITED STATES PATENTS

| | | | |
|---|---|---|---|
| 3,408,513 | 10/1968 | Cooper et al. | 307—252X |
| 3,445,742 | 5/1969 | Moscardi | 321—5X |
| 3,458,795 | 7/1969 | Ainsworth | 321—38X |
| 3,465,234 | 9/1969 | Phadke | 321—5 |
| 3,466,525 | 9/1969 | Ainsworth | 321—5 |
| 3,474,321 | 10/1969 | Ainsworth | 321—5 |

WILLIAM H. BEHA, JR., Primary Examiner

U.S. Cl. X.R.

321—11, 18, 38